No. 742,988. PATENTED NOV. 3, 1903.
H. S. HOWARD.
DISK HARROW.
APPLICATION FILED JAN. 26, 1903.
NO MODEL. 2 SHEETS—SHEET 2.
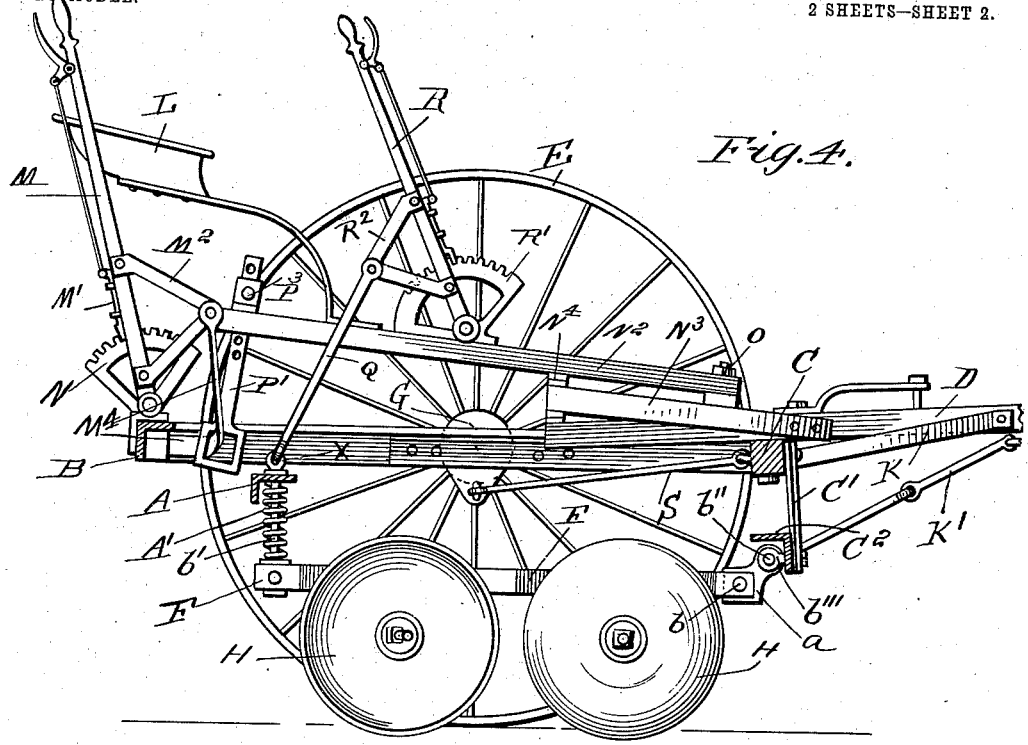
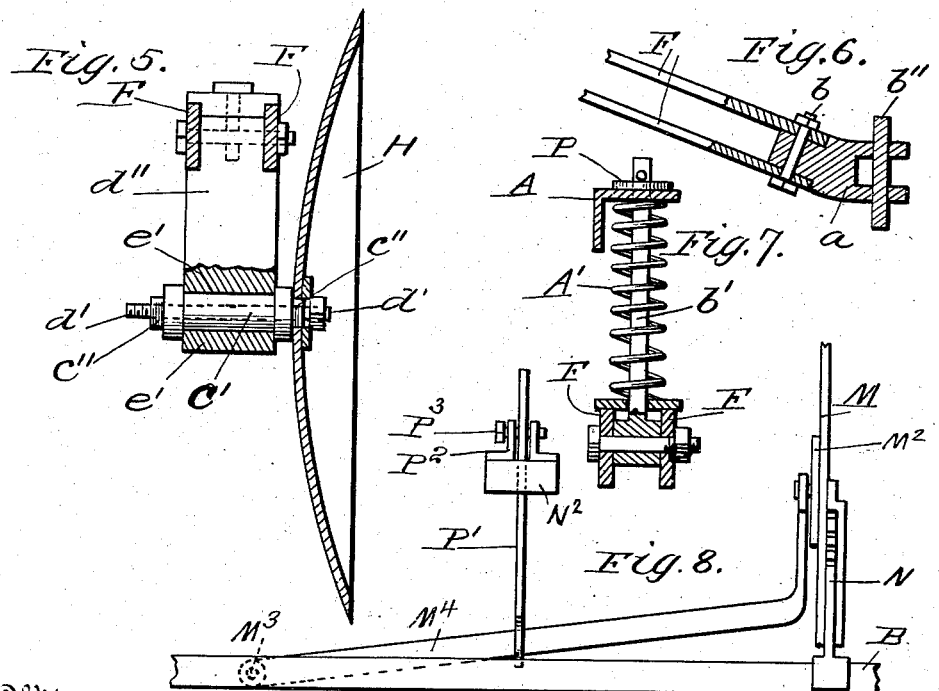
Witnesses: M. Babbitt, Q. A. White.
Inventor: Harlan S. Howard
By his Attorneys Davis & Davis No. 742,938. Patented November 3, 1903.

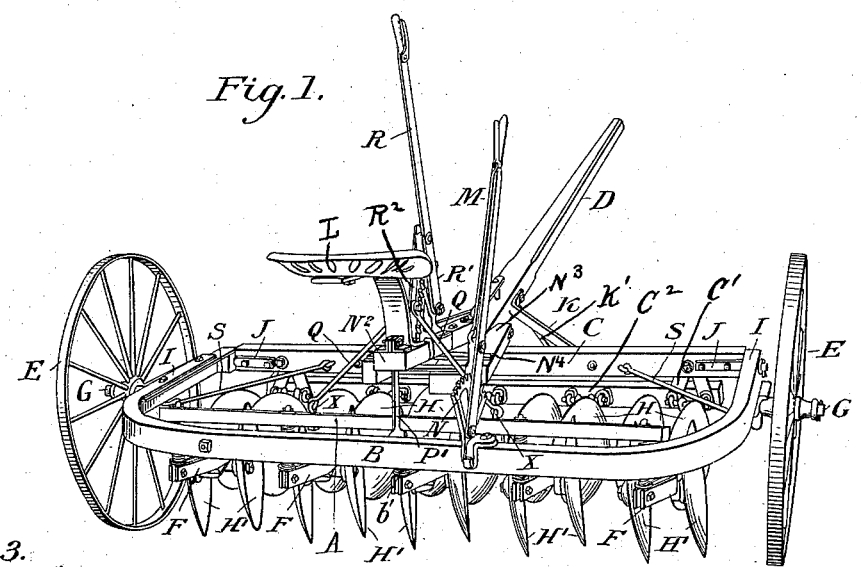
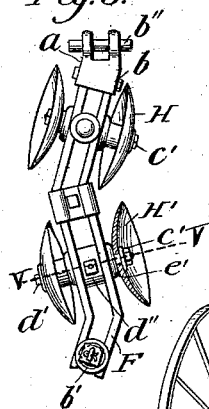
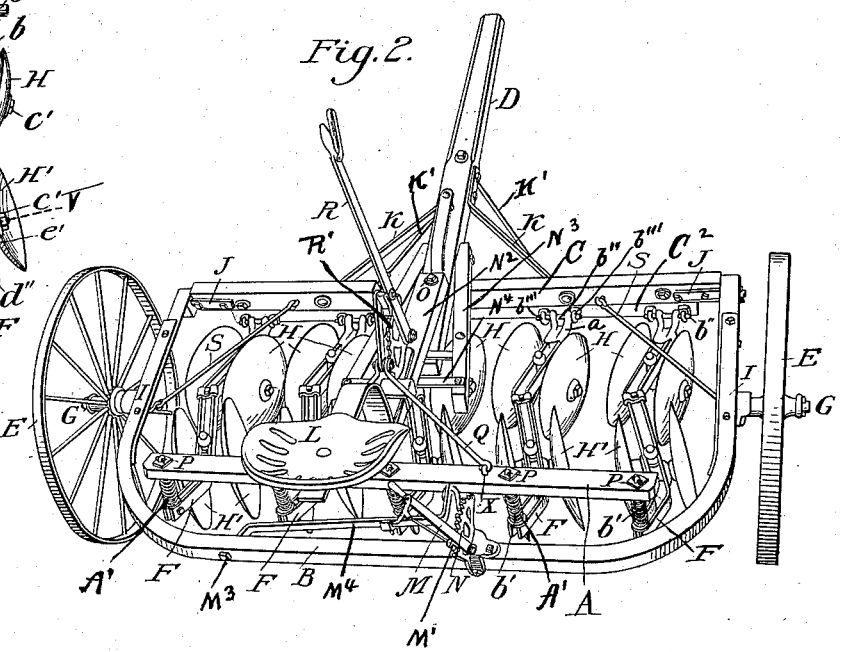

UNITED STATES PATENT OFFICE.

HARLAN SMITH HOWARD, OF MADISON, WISCONSIN.

DISK HARROW.

SPECIFICATION forming part of Letters Patent No. 742,988, dated November 3, 1903.

Application filed January 26, 1903. Serial No. 140,685. (No model.)

*To all whom it may concern:*

Be it known that I, HARLAN SMITH HOWARD, a citizen of the United States, residing at Madison, county of Dane, State of Wisconsin, have invented certain new and useful Improvements in Disk Harrows, of which the following is a specification, reference being had therein to the accompanying drawings, in which—

Figure 1 is a perspective view; Fig. 2, a similar view taken from a different point of view; Fig. 3, a plan view of one of the disk-carrying frames; Fig. 4, a longitudinal sectional view of the harrow; Fig. 5, a vertical sectional view on the line V V of Fig. 3; Fig. 6, a detail sectional view of means for connecting the disk-carrying frames to the front bar; Fig. 7, a detail vertical sectional view showing the means for connecting the rear end of the disk-carrying frame to the presser-bar, and Fig. 8 a rear elevation of the means for vertically adjusting the disk-carrying frames.

The invention relates to certain new and useful improvements upon that class of disk harrows and pulverizers which employ a plurality of transverse gangs or rows of concavo-convex revolving disks to pulverize the soil, one gang of disks being arranged in front of the other.

The invention consists, mainly, in so arranging the disks that the front rank will loosen the soil and turn it all in one direction and the rear rank or gang will recut it and turn it all in the opposite direction and in providing mechanism by which the disks may be raised and lowered to independently vary the depth at which the front or rear gang may be made to work in order to control the side draft of the disks and whereby they may be so adjusted that the side draft of the front gang will be exactly balanced by the opposite side draft of the rear gang.

The invention further consists in providing means by which both gangs or rows of disks may be simultaneously raised or lowered to vary the depth at which said disks will work.

Referring to the various parts by letters, B designates the main harrow-frame, to the sides of which are rigidly secured the outward-extending forward axles G, on which are mounted the transporting-wheels E. The frame B is substantially U-shaped in plan view, the ends of the arms thereof extending forward. Connecting the forward ends of the side bars of this frame is a horizontal bar C, to the ends of which are secured outward-extending irons J, which are loosely mounted in the ends of the side bars of the main frame to permit the bar C to have a rocking movement.

Rigidly bolted to the forward side of the rocking bar C are the downward-extending plates C', to the lower ends of which is bolted a supplemental cross-bar $C^2$, this supplemental cross-bar being parallel with and substantially equal in length to the rocking bar C. Pivotally connected to the rear side of the supplemental bar $C^2$ are the rearward-extending disk-carrying frames. There are five of these frames shown in the drawings; but, as is evident, there may be as many as are desired. Each of these frames consists of a pair of parallel bars F, which are bent in a zigzag manner, as shown in plan view in Fig. 3. The forward ends of these bars are secured, by means of the transverse bolts $b$, in recesses formed in the sides of the blocks $a$. Secured rigidly in the forward end of this block $a$ is a transverse pin $b''$, the ends of which project beyond the sides of the block $a$ and are loosely engaged in eyes $b'''$, which are bolted to the rear side of the supplemental bar $C^2$. By this means the disk-carrying bars or frames are permitted to have a vertical pivotal movement, but are held against lateral or side movement. To each disk-carrying frame are secured two pairs of disks, one pair being mounted on an axle which is perpendicular in plan view to one portion of the zigzag bars and the other pair being mounted on an axle which is perpendicular to another portion of said bars, so that said axles are angularly arranged with respect to each other and are oblique to the line of travel. As shown in Fig. 3, the forward axle extends forward and to the left and the rear axle extends forward and to the right. Each axle $c'$ is journaled in a box $e'$, which is provided with an upward extension $d''$. This extension fits between the bars F and is rigidly bolted thereto. The disks H are rigidly secured to the axle by means of a bolt $d'$, which passes longitudinally through the axle, suitable nuts and washers being secured to the ends of this bolt, and to prevent the disks turning on the axles rectangular openings are formed therein to receive the correspondingly-shaped ends $C''$ of the axles. By this arrangement of the disks the forward row or gang will throw the soil to the left, while the rear gang or row will throw it to the right.

The rear ends of the bars F are securely bolted to the lower ends of vertical bolts $b'$. On the upper ends of these bolts $b'$ is mounted a transverse presser-bar A, said bar being retained thereon by means of suitable keys and washers P, which are above the bar. Between this bar and the upper edges of the bars F are coil-springs $A'$, which surround the bolts $b'$ and normally hold the presser-bar at the top of the bolts.

Rigidly secured to the rocker-bar C, midway its ends, is the forward-extending tongue D. Bolted to the top of this tongue at point O, slightly in the rear of the cross-bar C, is the upward and rearward inclined extension $N^2$ of the tongue, this extension being supported in place by means of the upward and rearward extending bars $N^3$, which are connected at their rear ends by means of the cross-bar $N^4$, on which the extension $N^2$ rests and to which it is rigidly secured. Rigidly mounted on the rear bar of the main harrow-frame B is an upright segment N, and pivotally mounted on this segment is an upward-extending lever M, suitable locking devices $M'$ being provided to lock said lever at any desired point on the segment. Pivotally connected to the forward-extending part $M^2$ of this lever is the end of a transverse lever $M^4$, whose other end is pivotally secured to the rear bar of the main frame at $M^3$. In the rear end of the extension $N^2$ of the tongue is formed a vertical opening, through which extension passes an upright bar $P'$, in the lower end of which is formed an opening through which the bar $M^4$ extends. Secured to the extension $N^2$ are a pair of uprights $P^2$, through which passes a horizontal bolt $P^3$, said bolt being adapted to engage any one of a series of perforations in the bar $P'$. The purpose of this arrangement of the lever M, bar $M^4$, and bar $P'$ is that by throwing forward the lever M the rear end of the frame B and the extension of the tongue may be brought closer together and the disks thereby raised from the ground. It will be noted that by pulling down on the extension the forward bar C will be rocked on its pivots, thereby throwing up and forward the supplemental bar $C^2$ and raising the forward ends of the bars F. While raising the rear bar of the frame B the forward ends thereof will be depressed. This depression will be more than compensated for by the lifting of the supplemental bar $C^2$, so that the result will be a simultaneous lifting of both gangs or rows of disks. By shifting the bolt into any desired one of the series of perforations in the vertical bar $P'$ the amount of vertical movement of the disks may be regulated.

Mounted on top of the extension $N^2$ is an upright segment $R'$, to which is pivoted an upright lever R, suitable latching device being provided to hold said lever at any desired point on the segment. Pivotally connected to the rearward-extending part $R^2$ of the lever R are two rearward and downward extending bars Q, whose lower ends are connected to the top of the presser-bar by means of eyebolts X. By means of this lever R and rods Q the rear ends of the disk-carrying frames may be raised or lowered in order to vary the depth at which the rear gang or row of disks work. It will be noted that by throwing the lever R forward the presser-bar and the rear ends of the disk-carrying frames will be raised without materially altering the position of the forward gang of disks. The purpose of this is to permit the rear row of disks to be so adjusted to the soil worked upon that the side draft of the forward row or gang of disks will be exactly balanced by the opposite side draft of the rear row, this being accomplished by forcing the rear row of disks into the earth until their side draft equals the side draft of the front row.

Truss-braces S are connected at their forward ends to the rear of the rocker-bar C, the rear ends of these braces being connected to a downward extension of the inner ends of the rigid axles G. These truss-braces so strengthen the main frame B that very light angle-iron may be used. It is manifest that the strain on the side bars will tend to spring them outward while the machine is being drawn forward and that these truss-braces will take up this strain and thereby relieve the pivot-irons J. The strain on the transporting-wheels will also tend to throw outward that portion which bears on the ground and draw inward the upper parts of the wheels, and this tendency will be resisted by the truss-braces, said braces being connected at their rear ends to the wheel-axles below the axial center thereof and slightly below the frame B.

Diagonal braces K are connected to the forward side of the rocking bar C and to the sides of the tongue D and still further brace the rocking bar. To the forward side of the supplemental bar $C^2$ are secured the draft-rods $K'$, the forward ends of these draft-rods being connected to the under side of the tongue D.

The springs $A'$ yieldingly maintain the disks in contact with the earth and permit said disks to rise to pass obstructions. The driver-seat L is secured to the extension $N^2$ in the rear of the segment $R'$ in such a position that the levers M and R will be in convenient reach of the driver.

It has been found in practice where two gangs or disks are arranged as shown and described herein that if the two rows of disks are on the same level the side draft of the forward row is greater than that of the rear row. This is so because of the fact that the soil worked upon by the rear gang or row is softer than that worked upon by the forward row. To balance the side draft then of both rows, the rear gang must be set to work deeper in the soil than the forward row, and this may be readily accomplished by manipulating the lever R.

It is to be understood that my invention is not confined to the exact features of construction herein described and as shown in the drawings, as any one skilled in the art might vary the construction without materially departing from the scope of my invention.

Having thus described my invention, what I claim as new, and desire to secure by Letters Patent, is—

1. In a disk harrow comprising a supporting-frame, transporting-wheels therefor, a series of rearward-extending disk-carrying frames pivotally connected at their forward ends to said frame, two rows of disks carried by said disk-carrying frames, the forward row being arranged to turn the soil in one direction and the rear row being arranged to turn the soil in the opposite direction, and means for vertically adjusting the rear ends of the disk-carrying frames.

2. In a disk harrow, the combination, of a supporting-frame, transporting-wheels therefor, a series of rearward-extending zigzag disk-carrying bars, two rows of disks mounted on said bars, one forward of the other, the forward row being arranged to turn the soil in one direction and the rear row being arranged to turn it in the opposite direction, means for pivotally connecting the forward ends of the disk-carrying frames to the main frame, and means connected to the rear ends of said disk-carrying frames to vertically adjust said rear ends.

3. In a disk harrow the combination, of a main frame, transporting-wheels therefor, a series of rearward-extending disk-carrying frames, means for pivotally connecting the forward ends of these frames to the main frame, two rows of disks carried by said disk-carrying frames the forward row being arranged to turn the soil in one direction and the rear row being arranged to turn the soil in the opposite direction, a presser-bar connected to the rear ends of the disk-carrying frames, springs interposed between said presser-bar and the disk-carrying frames, and means connected to the presser-bar for vertically adjusting the rear ends of the disk-carrying frames.

4. In a disk harrow the combination, of a main frame, transporting-wheels, a rocking cross-bar, a tongue secured thereto, said tongue extending rearward beyond the cross-bar, depending bars connected to the rocking bar, a supplemental cross-bar connected to the lower ends of these depending bars, a series of rearward-extending disk-carrying frames pivotally connected to said supplemental bar, disks carried by said frames, and means connected to the main frame and to the rear end of the tongue whereby the disk-carrying frames may be vertically adjusted simultaneously.

5. In a disk harrow the combination, of a main frame, transporting-wheels, axles for said wheels secured rigidly to the side bars of the main frame, a cross-bar connecting the forward ends of the side bars of the main frame, truss-braces connected at their forward ends to the cross-bar and at their rear ends to the axles of the transporting-wheels, below the main frame, a series of rearward-extending disk-carrying frames, a front row of disks secured to said frames and extending the entire width of the main frame and arranged to turn the soil in one direction, and a rear row of disks secured to said frames, substantially equal in length to the front row of disks and arranged to turn the soil in the other direction.

6. In a disk harrow the combination, of a supporting-frame, transporting-wheels therefor, a series of longitudinally-arranged disk-carrying frames pivotally connected at one of their ends to the said frame, two rows of disks carried by said disk-carrying frames the forward row being arranged to turn the soil in one direction and the rear row being arranged to turn the soil in the opposite direction and means for vertically adjusting the free ends of said disk-carrying frames.

7. In a disk harrow the combination, of a main frame, transporting-wheels, axles for said wheels secured rigidly to the side bars of the main frame, the cross-bar connecting the forward ends of the side bars of the main frame, inward and forward extending truss-braces connected at their forward ends to the cross-bar and at their rear ends to the axles of the transporting-wheels below the axial centers thereof, a series of disk-carrying frames pivoted in the main frame and cultivator-disks mounted in said disk-carrying frames.

8. In a disk harrow the combination of a supporting-frame, transporting-wheels therefor, a series of longitudinally-arranged disk-carrying frames pivotally connected at one of their ends to the said frame, a plurality of rows of disks carried by said disk-carrying frames, one half of said disks being arranged to turn the soil in one direction and the other half being arranged to turn the soil in the opposite direction.

9. In a disk harrow the combination of a supporting-frame, transporting-wheels therefor, a series of longitudinally-arranged disk-carrying frames pivotally connected at one of their ends to said frame, each disk-carrying frame being formed of a horizontally-zigzag bar, a plurality of disk-carrying axles mounted in each disk-carrying frame, each of said disk-carrying axles being perpendicular in plan view to that portion of the frame to which it is secured, and cultivator-disks mounted on said axles.

10. A disk-carrying frame for a disk harrow comprising, a horizontally-zigzag bar, disk-axles mounted on said bar, each of said axles being perpendicular in plan view to that portion of the frame to which it is secured, whereby said axles will be angularly arranged with respect to each other, and cultivator-disks mounted on said disk-axles.

11. A disk-carrying frame for a disk harrow comprising, a horizontally-zigzag bar, disk-axles mounted on said bar, each of said axles being perpendicular in plan view to that portion of the frame to which it is secured whereby said axles will be angularly arranged with respect to each other, cultivator-disks mounted on said disk-axles, some of said disks being arranged to turn the soil in one direction and others being arranged to turn the soil in the opposite direction.

12. A disk harrow, the combination of a main frame, transporting-wheels, axles for said wheels secured to the said bars of the main frame, a cross-bar connecting the forward ends of the side bars of the main frame, inward-extending truss-braces connected at their forward ends to a rigid part and at their rear ends to the axles of the transporting-wheels, below the axial centers thereof, and cultivator means carried by the main frame.

HARLAN SMITH HOWARD.

Witnesses:
JOHN G. KANOUSE,
MARY S. SLAUGHTER.